Sept. 14, 1954 D. C. PORTER 2,689,084

CALCULATOR

Filed Jan. 29, 1953 4 Sheets-Sheet 1

DEAN C. PORTER,
INVENTOR.

BY Lyon & Lyon

ATTORNEYS

Sept. 14, 1954 D. C. PORTER 2,689,084

CALCULATOR

Filed Jan. 29, 1953 4 Sheets-Sheet 2

DEAN C. PORTER,
INVENTOR.

BY Lyon & Lyon

ATTORNEYS

Sept. 14, 1954 D. C. PORTER 2,689,084

CALCULATOR

Filed Jan. 29, 1953 4 Sheets-Sheet 3

DEAN C. PORTER,
INVENTOR.

BY Lyon & Lyon

ATTORNEYS

Sept. 14, 1954

D. C. PORTER 2,689,084

CALCULATOR

Filed Jan. 29, 1953

4 Sheets-Sheet 4

DEAN C. PORTER,
INVENTOR.

BY Lyon & Lyon

ATTORNEYS

Patented Sept. 14, 1954 2,689,084

UNITED STATES PATENT OFFICE 2,689,084

CALCULATOR

Dean C. Porter, Los Angeles, Calif.

Application January 29, 1953, Serial No. 333,967

16 Claims. (Cl. 235—64)

This invention relates to calculators and has particular reference to a mechanical device adapted to be used in performing the arithmetical operation of addition.

One of the principal objects of this invention is to provide a mechanical calculator which is small in size and easily adapted to be carried in the pocket or purse of the user.

The calculator of this invention is particularly suited to be assembled upon a writing instrument, such as a pencil or pen, but the invention, of course, is not so limited.

Devices of this general type have been proposed before, but all such devices have had one or more inherent disadvantages which, from a practical standpoint, has precluded their successful commercial exploitation; for example, many of the devices required complicated procedures from the operators and, hence were too troublesome from an operating standpoint to be acceptable. Others required mechanisms which were too complex to be commercially practicable since pocket calculators which, of course, are not intended to replace the desk type calculating machines, must be relatively inexpensive to produce and sell. Other devices which have been proposed are subject to problems of friction and require a prohibitively large amount of force to operate them, resulting in fatigue and diversion of the attention of the operator.

Another object of this invention is, therefore, to provide a calculator of the type described which is not subject to these and other disadvantages found in calculators heretofore proposed.

Another object of the invention is to provide a calculator which is particularly simple to operate, requiring manual movement in only one direction, return movement being accomplished by spring action, and which is so arranged that the user can manipulate the calculator by the sense of touch so that the calculator dials need not be watched continuously.

With the above and other objects in view, as may appear hereinafter, reference is directed to the drawings, in which.

Figure 2:
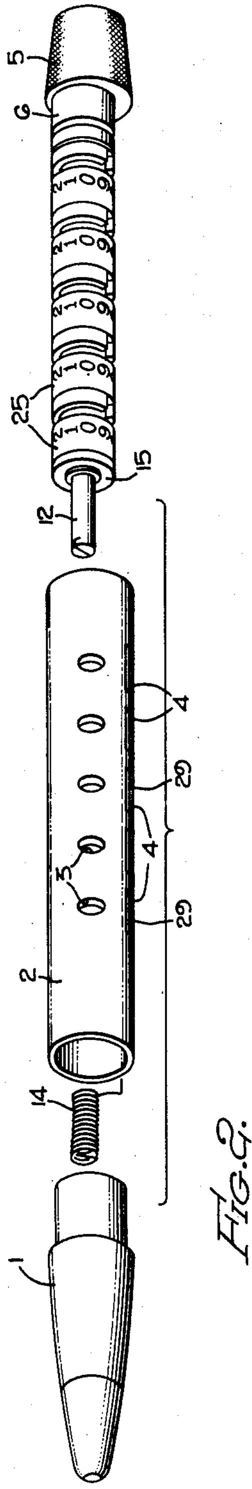
Figure 2 is a slightly enlarged exploded view showing the main components of the calculator.

My calculator is designed to fit within the boundaries of a cylinder of small diameter so that the calculator may be incorporated within a pencil or pen or similar device.

A pencil or pen unit 1 is provided, on which fits a cylindrical shell 2 forming the pencil or pen handle. The shell is provided with a row of digit viewing windows 3 and a row of key plate apertures 4 displaced circumferentially from corresponding windows 3.

The extended end of the shell 2 journals an operating knob 5. The shell 2 is provided with a bore which is eccentric with respect to the outer periphery of the shell. The operating knob 5 is provided with an eccentric bearing portion 6 adapted to journal in the eccentric bore of the shell. The bearing portion 6 of the operating knob is provided with an arcuate operating slot 7 which preferably extends approximately 60°.

Spaced axially from the operating slot 7 is a clearance slot 8 which preferably extends 330°. The ends of each of the two slots 7 and 8 are disposed in axial alignment and are joined by an axially extending connecting slot 9. A pin 10 extends through the wall of the shell 2 into the slots 7, 8 and 9. When the operating knob is in its axially inner position relative to the shell, the pin 10 is disposed in the operating slot 7 and the knob 5 is limited to a 60° oscillating movement. By pulling outwardly on the operating knob the pin may be removed through the connecting slot 9 into the clearance slot 8 so that the knob may be turned an additional 330°, thus making it possible to rotate the knob a total of 390°.

Screw threaded into the operating knob is a main shaft 11 which extends through the shell 2 in coaxial relation with its bore. The end of the main shaft remote from the operating knob is screw threaded into a retainer bushing 12 which is journaled in a partition 13 separating the bore of the shell from the end of the shell which connects to the pencil or pen unit 1. The retainer bushing 12 forms a stem around which is wrapped a main spring 14, one end of which is anchored to the shell and the other end of which is anchored to the retainer bushing. The end of the retainer bushing within the shell bore is flanged as indicated by 15.

Mounted on the main shaft 11 in tandem relation is a series of winding sleeves 16. In the construction illustrated five such sleeves are shown. The sleeves are clamped in series between the retainer bushing and the operating knob so that they are firmly secured to the main shaft 11 and rotate therewith. One end of each winding sleeve is provided with a segmental flange portion 17 having a circumferential slot in which is pivotally mounted a winding pawl 18. A spring is provided to urge the extended end of the pawl outwardly.

Journaled on each winding sleeve 16 is a transfer sleeve 19 which is provided with a flange 20 which is interrupted by a minor notch 21A and a major notch 21B. The flanged end of each transfer sleeve is recessed slightly to accommodate the pawl carrying end of the adjacent winding sleeve. The notches 21A and 21B intersect the recessed end. The opposite end of the transfer sleeve is provided with an arcuately directed segment 22 occupying approximately a half circle on which is pivotally mounted a transfer pawl 23. The pawl has a stepped extremity the purpose of which will be brought out hereinafter. A spring urges the extremity of the pawl radially outward. Adjacent the pivot end of the pawl the transfer sleeve is provided with an axial tongue 24. The tongue 24 and segment 22 are adapted to axially overlap the segmental flange portion 17.

Journaled on each transfer sleeve 19 is a numeral or indicator ring 25. One end of the numeral ring is provided with an internal ratchet 26. For purposes of digital counting the ratchet has ten notches. One notch designated 27 is employed to effect transfer of the counting operation from one numeral ring to the succeeding numeral ring, as will be brought out hereinafter. The opposite end of each numeral ring is reduced in diameter except for a small lug which serves as a clearing tooth 28. Each numeral ring is so positioned that its internal ratchet is engaged by the pawl 18 of the corresponding winding sleeve 16 as well as the pawl of the corresponding transfer sleeve. Each of the numeral rings 25 is impressed with a ring of digital numbers which register with a corresponding viewing window 3.

Figure 6:
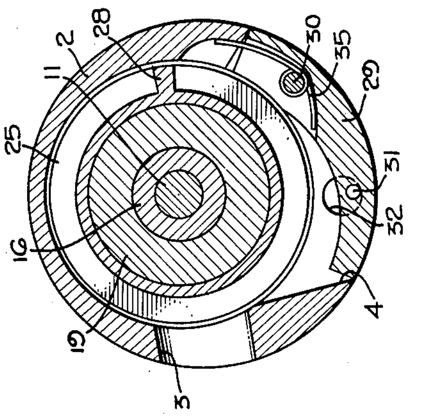
Figure 6 is a transverse sectional view through 6—6 of Figure 3, showing particularly the key plate and dial sleeve clearing lug.
Figure 5:
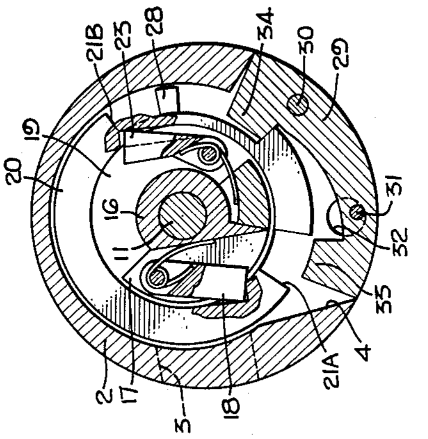
Figure 5 is a sectional view through 5—5 of Figure 3 showing the parts in the same position as in Figure 4 and showing the key plate.
Figure 4:
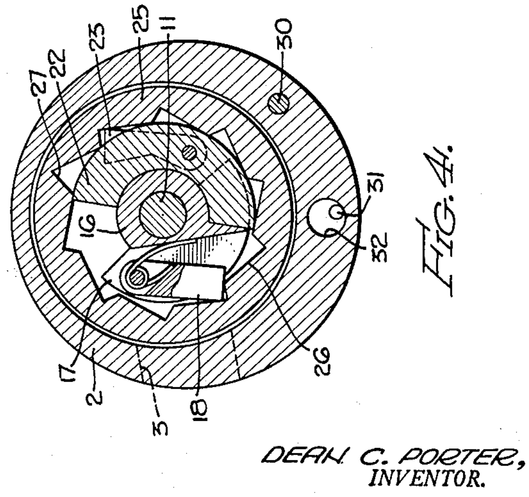
Figure 4 is a transverse sectional view through 4—4 of Figure 3 showing the dial sleeve, winding sleeve and transfer sleeve with the pawls of the winding sleeve and transfer sleeve in their normal positions.
Figures 7, 7A:
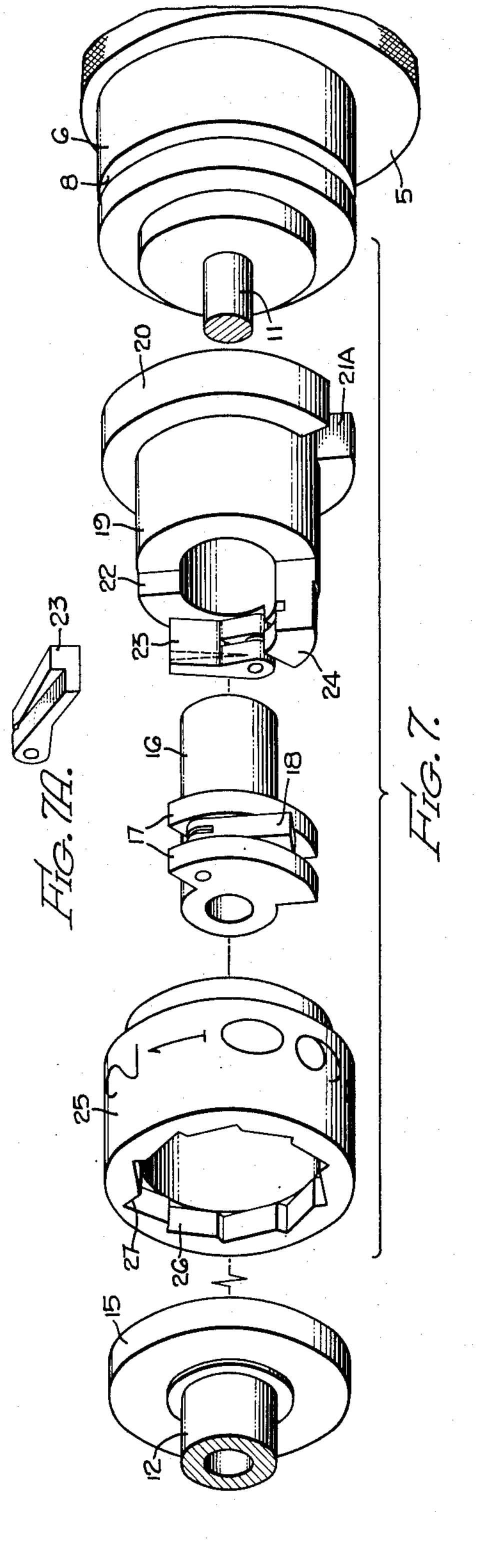
Figure 7 is an enlarged exploded view showing the elements associated with one of the numeral rings and indicating the adjacent ends of the interior bushing and bearing and operating knob.
Figure 7A is a perspective view of the transfer sleeve pawl.

Each of the apertures 4 provided in the shell 2 receives an arcuate key plate 29. The series of key plates is pivotally supported by a common pivot shaft 30 extending axially along and through the wall of the shell 2. Each key plate receives an axially directed stop pin 31. Each stop pin projects into a recess 32 of sufficient dimension to allow a predetermined pivotal movement of the corresponding key plate. Each key plate is provided at its extended end with a radially inwardly directed adding lug 33, positioned to fit in a corresponding notch 21A of a corresponding transfer sleeve 19. Each key plate is also provided with a clearing lug 34 which projects into the major notch 21B of the corresponding transfer sleeve. A spring 35 urges each key plate to an outer or flush position as shown in Figure 6.

Figure 1:
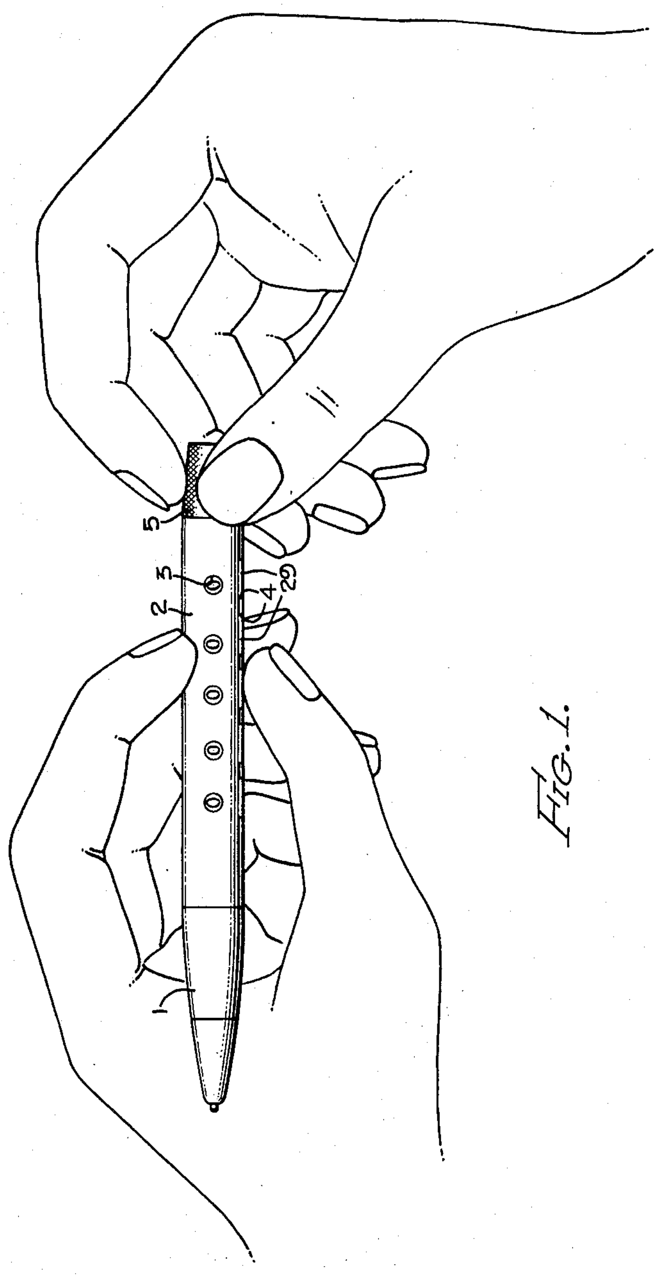
Figure 1 is a side view of my calculator incorporated in a pencil and indicating the manner in which it is manipulated.
Figure 3:
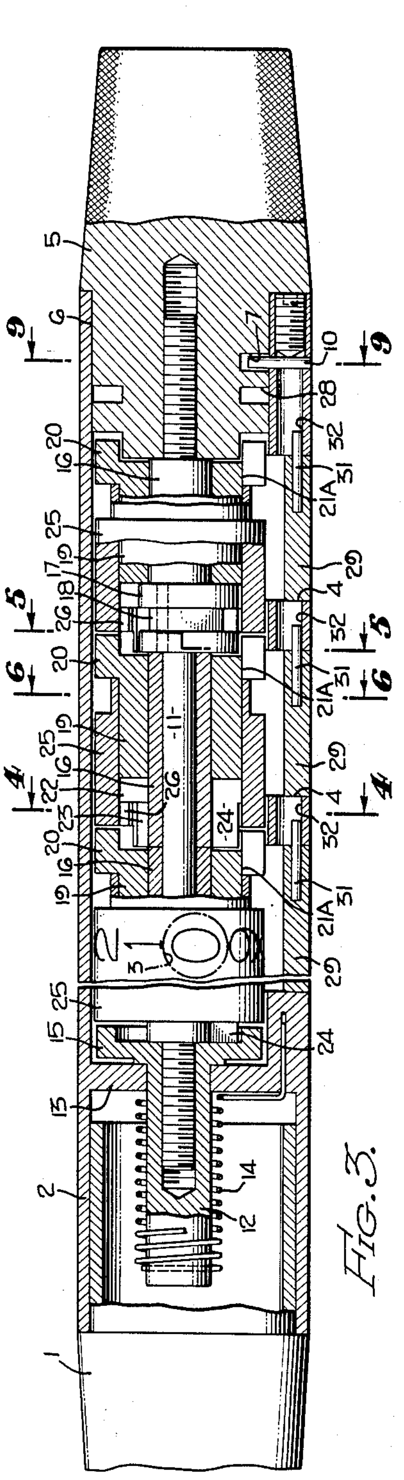
Figure 3 is an enlarged fragmentary longitudinal sectional view of my calculator with portions shown in elevation.

Operation of my calculator is as follows:

When the operating knob 5 is in its axially inner position shown in Figures 1 and 3 the pin 10 rides in the operating slot 7 so that arcuate movement of the operating knob 5 is limited to approximately 60°. This movement is adequate, allowing for desirable overplay to operate the winding sleeves 16. Normally, the entire assembly is carried by the main shaft 11 oscillated with movement of the operating knob; however this movement is not effective to advance the numeral rings 25 unless a corresponding transfer sleeve is locked against rotation. A selector transfer sleeve is locked by pressing inwardly on the corresponding key plate 29, which causes its adding lug 33 to engage in the minor notch 21A of the corresponding transfer sleeve. When a selected transfer sleeve 19 is locked against rotation, its pawl 23 acts to prevent back travel of the corresponding dial sleeve so that the pawl of the corresponding winding sleeve can advance the corresponding numeral ring one notch (and, hence, one digit) for each oscillation of the operating knob. Thus, for example, if one desired to enter the number 528 the operator would first hold the "hundreds" key plate and oscillate the operating knob five times. The "tens" key plate then would be held and the operating knob oscillated twice. The "units" key plate would be held and the operating knob oscillated eight times. In order to add another number, the manipulation of the operating knob would be repeated, the operator holding the appropriate key plates. It should be observed that the order in which any number is fed into the calculator is immaterial; that is, one can operate the numeral rings in reverse sequence, i. e., units, tens, then hundreds.

Once during every ten numeral ring advances, or during each revolution of the numeral ring, the transfer sleeve pawl 23 drops into the transfer ratchet notch 27, which is deeper than the other notches. The pawl 23 has a stepped end which projects axially beyond the ratchet and is capable of engaging in the major notch 21B formed in the flange of the adjacent transfer sleeve so that, for example, if the units dial is initially in zero position, oscillation of the operating knob nine times while the units key plate is held causes the pawl 23 of the units transfer sleeve to swing radially outward into the major notch 21B of the "tens" transfer sleeve and engage the flange 20 at one extremity thereof and locks the "tens" transfer sleeve so that the tenth oscillation of the operating knob acting through the units and tens winding sleeves will advance both the units and tens numeral rings.

Figure 8:
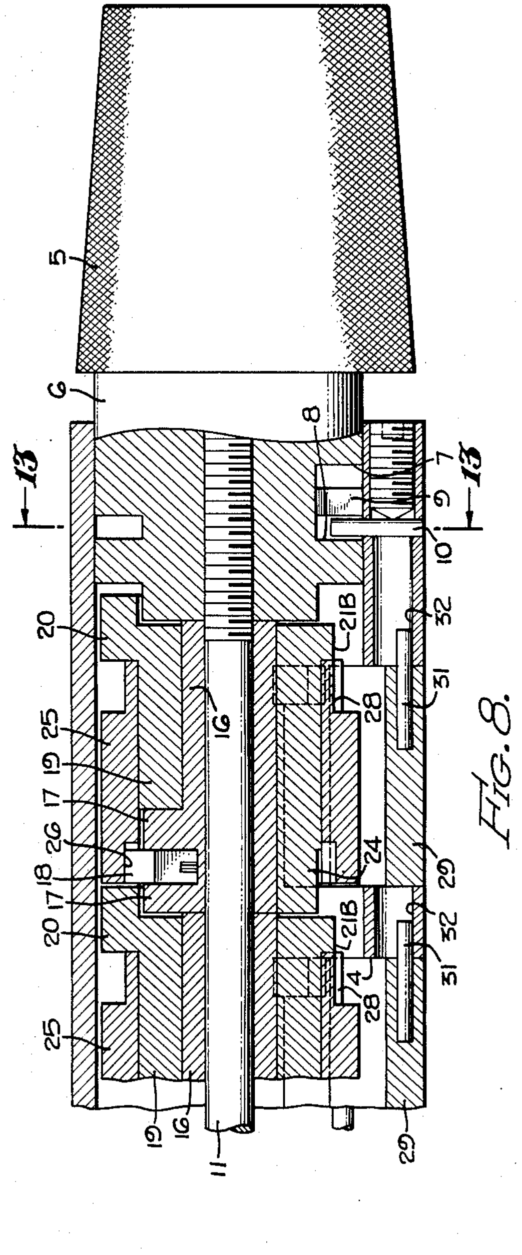
Figure 8 is a further enlarged fragmentary longitudinal sectional view showing the operating knob and adjacent mechanism withdrawn to clearing position.
Figures 9, 10, 11, 12:
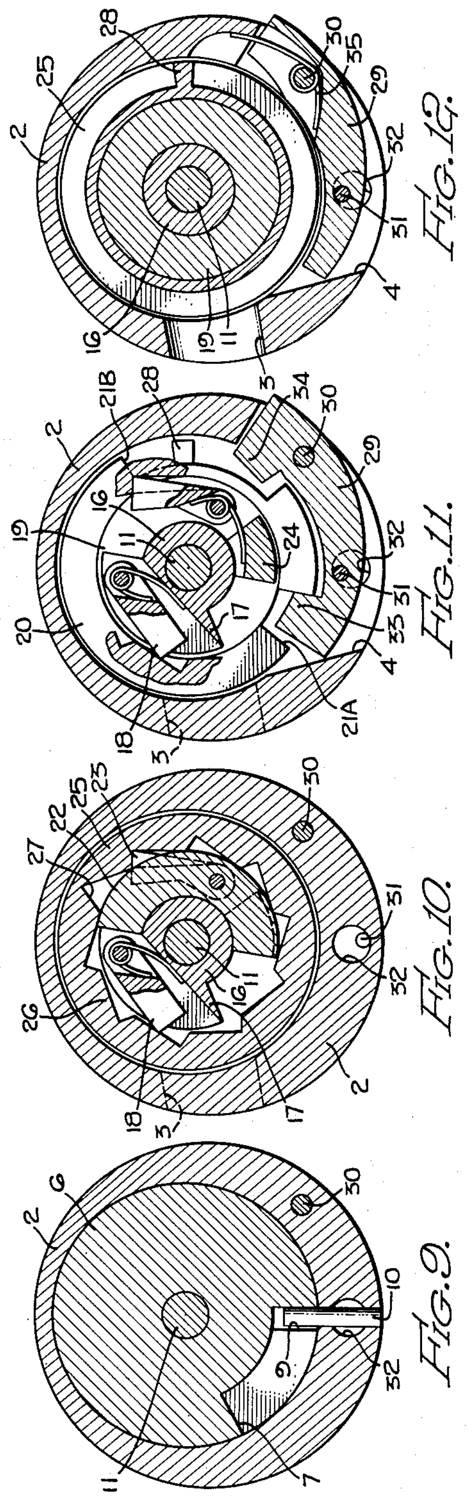
Figure 9 is a transverse sectional view through 9—9 of Figure 3 taken through the operating knob.
Figure 10 is a transverse sectional view in the plane of Figure 4 showing the winding sleeve turned into position for advancing the numeral ring.
Figure 11 is a transverse sectional view corresponding to Figure 5 showing the parts in the condition corresponding to Figure 10 and indicating particularly the effect of depressing a key plate.
Figure 12 is a transverse sectional view corresponding to Figure 6.
Figure 15:
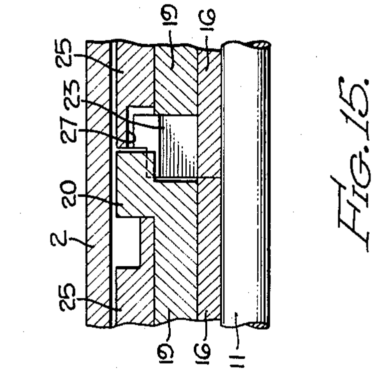
Figure 15 is a fragmentary longitudinal sectional view taken through 15—15 of Figure 14 and illustrating the operation of the transfer pawl.
Figure 14:
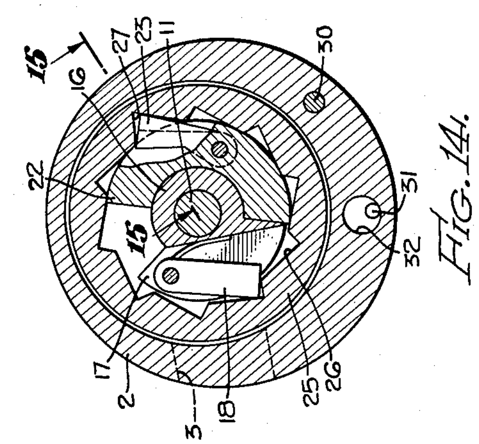
Figure 14 is a transverse sectional view taken in the plane of Figures 4 and 10 and illustrating the operation of the transfer pawl.
Figure 13:
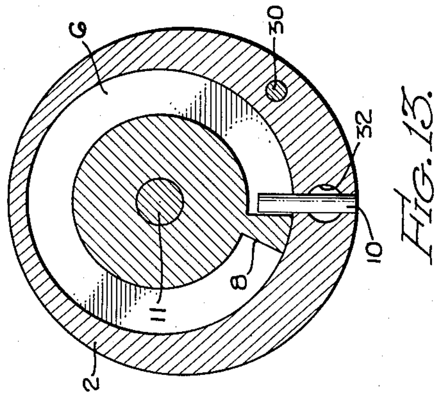
Figure 13 is a transverse sectional view through 13—13 of Figure 8.

In order to "clear" the numbers and return the dial sleeves to the zero position, the operating knob is first moved 60° in the direction of the arrow in Figure 1 (which is the direction employed to operate the dial sleeves) and then pulled axially to move the pin 10 through the connecting slot 9 into the clearance slot 8; that is, to the position shown in Figure 8.

The axial movement of the knob shifts the entire assembly including winding sleeves, transfer sleeves and numeral rings; and, in doing so, moves the transfer sleeves so that the major and minor notches 21A and 21B clear the lugs 33 and 34. This axial movement also moves the clearing teeth 28 of the numeral rings 25 into position for engagement with clearing lug 34.

The operating knob is then rotated a further 330°, causing clearing teeth 28 of the several numeral rings to engage the lugs 34 and align the numeral rings. The operating knob is then returned to the connecting slot 9, moved axially inward to its operating slot 7, and then moved circumferentially to the extremity of the operating slot. This movement places all of the numeral rings in "zero" position, and the knob in its normal position.

The main spring 14 is so arranged as to exert an axial force on the main shaft and operating knob so that normally the operating knob remains in its inner or operating position; furthermore, the torque of the main spring urges the knob counterclockwise as viewed in the transverse sectional views so that manual movement in only one direction is required.

Having fully described my invention, it is to be understood that I do not wish to be limited to the details herein set forth, but my invention is of the full scope of the appended claims.

I claim:

1. A calculator, comprising: a shell having a cylindrical bore and a row of indicia viewing windows in the wall thereof; an oscillatable shaft within said shell having an operating knob at one end thereof; indicia rings within said shell and having numerical indicia visible at said windows; means operatvely connecting said rings with said shaft tending to oscillate all of said rings with oscillation of said shaft; and an externally accessible lock element for each of said rings manually movable to an operative position to cause unidirectional advance of the corresponding ring upon oscillation of said shaft.

2. A calculator, comprising: a shell having a cylindrical bore and a row of indicia viewing windows in the wall thereof; an oscillatable shaft within said shell having an operating knob at one end thereof; indicia rings within said shell and having numerical indicia visible at said windows; winding sleeves on said shaft operatively engageable with said rings tending to cause oscillation of all of said rings with oscillation of said shaft; transfer sleeves also on said shaft and normally oscillatable therewith; and an externally accessible lock element for each of said rings manually movable to an operative position to restrain a corresponding transfer sleeve, said transfer sleeves adapted, when restrained, to cooperate with said winding sleeves to advance said rings on oscillation of said main shaft.

3. A calculator, comprising: a shell having a cylindrical bore, a row of indicia viewing windows in the wall thereof and key plate apertures in correspondence with said viewing windows; a series of manually pivotable key plates set in said apertures; a series of indicator rings within said shell and having indicia visible through said windows; manually operated ratchet drive means for advancing said rings in predetermined increments, said drive means being normally inoperative; and means engageable by said key plates to render said drive means operable with respect to selected drive means.

4. A calculator, comprising: a cylindrical shell having a row of indicia viewing windows; a series of indicator rings within said shell having a ring of digital indicia thereon visible through said windows; drive means operable to oscillate all of said indicators in unison; and manually operated means operatively associated with each of said rings to limit a corresponding ring to unidirectional movement in predetermined increments on oscillation of said drive means to bring its indicia in sequence in registry with its window.

5. A calculator, comprising: a cylindrical shell having a row of indicia viewing windows; a series of indicator rings within said shell having a ring of digital indicia thereon visible through said windows; drive means operable to oscillate all of said indicators in unison; manually operated means operatively associated with each of said rings to limit a corresponding ring to unidirectional movement in predetermined increments on oscillation of said drive means to bring its indicia in sequence in registery with its window; and means incorporated in each preceding drive means to operate a succeeding ring after rotation of the preceding ring independently of the corresponding manually operated means.

6. A calculator, comprising: a cylindrical shell having a row of indicia viewing windows; a series of indicator rings within said shell having a ring of digital indicia thereon visible through said windows; an operating handle at one end of said shell, said operating handle having an adding position permitting predetermined circumferential oscillation of the handle, and an axially displaced clearing position permitting increased circumferential movement; means connecting said handle with all of said rings tending to move said rings circumferentially in unison with said handle; manually operated means operatively associated with each of said rings when said handle is in its adding position for restraining a selected dial to unidirectional movement thereby to cause the selected ring to advance digitally on oscillation of said handle; and means operable, when said handle is in its clearing position, to move said rings a predetermined common position.

7. A calculator, comprising: a cylindrical shell having a row of indicia viewing windows; a series of indicator rings within said shell having a ring of digital indicia thereon visible through said windows; a handle at one end of said shell; a shaft extending through said shell; a ratchet drive means connecting each ring with said shaft, said ratchet drive means normally being inoperative; manually operable means for each ring and its drive means to render said drive means operable whereby a selected ring may be advanced digitally on oscillation of said handle and shaft; and means incorporated in each preceding ratchet drive means for rendering the succeeding drive means operative on complete rotation of the preceding ring, irrespective of operation of the manual means for said succeeding drive means.

8. A calculator, comprising: a cylindrical shell having a row of indicia viewing windows; a series of indicator rings within said shell having a ring of digital indicia thereon visible through said windows; an operating handle at one end of said shell, said operating handle having an adding position permitting predetermined circumferential oscillation of the handle, and an axially displaced clearing position permitting increased circumferential movement; means connecting said handle with all of said rings tending to move said rings circumferentially in unison with said handle; manually operated means operatively associated with each of said rings when said handle is in its adding position for restraining a selected ring to unidirectional movement thereby to cause the selected ring to advance digitally on oscillation of said handle; means operable, when said handle is in its clearing position, to move said rings a predetermined common position; and a device operable as each preceding ring is advanced one revolution to effect a digital advance of the succeeding ring irrespective of operation of the manual means corresponding thereto.

9. A calculator comprising: a shell having a cylindrical bore, a row of indicia viewing windows in the wall thereof and key plate apertures in correspondence with said viewing windows; a series of manually pivotable key plates set in said apertures; a series of indicator rings within said shell and having indicia visible through said windows; manually operated ratchet drive means for advancing said rings in predetermined increments, said drive means being normally inoperative; means engageable by said key plates to render said drive means operable with respect to selected drive means; and a device operable as each preceding ring is advanced one revolution to advance the succeeding ring irrespective of operation of the key plate of said succeeding ring.

10. A calculator, comprising: a shell having a cylindrical bore, a row of indicia viewing windows in the wall thereof and key plate apertures in correspondence with said viewing windows; a series of manually pivotable key plates set in said apertures; a series of indicator rings within said shell and having indicia visible through said windows; manually operated ratchet drive means for advancing said rings in predetermined increments, said drive means being normally inoperative; means engageable by said key plates to render said drive means operable with respect to selected drive means; a device operable as each preceding ring is advanced one revolution to advance the succeeding ring irrespective of operation of the key plate of said succeeding ring; and clearing means operable on axial displacement and rotation of said manual drive means to engage all of said rings and cause said rings to be brought into identical positions.

11. A calculator, comprising: a cylindrical shell having a series of viewing windows, and corresponding key plate apertures; a shaft journalled in said shell and having a drive knob at one end; a series of winding sleeves secured to said shaft, each having a drive pawl; a series of transfer sleeves journalled on said winding sleeve and each having a restraining pawl; a series of indicator rings journalled on said transfer sleeve and having internal ratchets engageable by said pawls; a key plate set in each key plate aperture and manually operable to engage each transfer sleeve, to cause its pawl to cooperate with the pawl of the corresponding winding sleeve thereby to advance the corresponding indicator ring, said key plates normally disengaged from their transfer sleeves whereby said corresponding pawls are inoperative to advance said indicator rings.

12. A calculator, comprising: a cylindrical shell having a series of viewing windows, and corresponding key plate apertures; a shaft journalled in said shell and having a drive knob at one end; a series of winding sleeves secured to said shaft, each having a drive pawl; a series of transfer sleeves journalled on said winding sleeve and each having a restraining pawl; a series of indicator rings journalled on said transfer sleeve and having internal ratchets engageable by said pawls; a key plate set in each key plate aperture and manually operable to engage each transfer sleeve, to cause its pawl to cooperate with the pawl of the corresponding winding sleeve thereby to advance the corresponding indicator ring, said key plates normally disengaged from their transfer sleeves whereby said corresponding pawls are inoperative to advance said indicator rings; certain of said indicator rings arranged with one ratchet tooth of different configuration and arranged for cooperation with the succeeding transfer sleeve to effect digital advance of a succeeding indicator ring irrespective of operation of its corresponding key plate.

13. A calculator, comprising: a cylindrical shell having a series of viewing windows, and corresponding key plate apertures; a shaft journalled in said shell and having a drive knob at one end; a series of winding sleeves secured to said shaft, each having a drive pawl; a series of transfer sleeves journalled on said winding sleeve and each having a restraining pawl; a series of indicator rings journalled on said transfer sleeve and having internal ratchets engageable by said pawls; a key plate set in each key plate aperture and manually operable to engage each transfer sleeve, to cause its pawl to cooperate with the pawl of the corresponding winding sleeve thereby to advance the corresponding indicator ring, said key plates normally disengaged from their transfer sleeves whereby said corresponding pawls are inoperative to advance said indicator rings; and clearing means operable on axial displacement and rotation of said drive knob and shaft to engage all of said indicator rings and cause them to be brought into identical positions.

14. A calculator, comprising: a cylindrical shell having a series of viewing windows, and corresponding key plate apertures; a shaft journalled in said shell and having a drive knob at one end; a series of winding sleeves secured to said shaft, each having a drive pawl; a series of transfer sleeves journalled on said winding sleeve and each having a restraining pawl; a series of indicator rings journalled on said transfer sleeve and having internal ratchets engageable by said pawls; a key plate set in each key plate aperture and manually operable to engage each transfer sleeve, to cause its pawl to cooperate with the pawl of the corresponding winding sleeve thereby to advance the corresponding indicator ring, said key plates normally disengaged from their transfer sleeves whereby said corresponding pawls are inoperative to advance said indicator rings; said indicator rings having clearing elements engageable with said plates upon axial displacement and rotation of said shaft and drive knob to cause all of said indicator rings to move in unison to a zero position.

15. A calculator, comprising: a cylindrical shell having a series of viewing windows, and corresponding key plate apertures; a shaft journalled in said shell and having a drive knob at one end; a series of winding sleeves secured to said shaft, each having a drive pawl; a series of transfer sleeves journalled on said winding sleeve and each having a restraining pawl; a series of indicator rings journalled on said transfer sleeve and having internal ratchets engageable by said pawl; a key plate set in each key plate aperture and manually operable to engage each transfer sleeve, to cause its pawl to cooperate with the pawl of the corresponding winding sleeve thereby to advance the corresponding indicator ring, said key plates normally disengaged from their transfer sleeves whereby said corresponding pawls are inoperative to advance said indicator rings; certain of said indicator rings arranged with one ratchet tooth of different configuration and arranged for cooperation with the succeeding transfer sleeve to effect digital advance of a succeeding indicator ring irrespective of operation of its corresponding key plate; said indicator rings having clearing elements engageable with said plates upon axial displacement and rotation of said shaft and drive knob to cause all of said indicator rings to move in unison to a zero position.

16. A calculator, comprising: a cylindrical shell having a series of viewing windows, and corresponding key plate apertures; a shaft journalled in said shell and having a drive knob at one end; a series of winding sleeves secured to said shaft, each having a drive pawl; a series of transfer sleeves journalled on said winding sleeve and each having a restraining pawl; a series of indicator rings journalled on said transfer sleeve and having internal ratchets engageable by said pawls; a key plate set in each key plate aperture and manually operable to engage each transfer sleeve, to cause its pawl to cooperate with the pawl of the corresponding winding sleeve thereby to advance the corresponding indicator ring, said key plates normally disengaged from their transfer sleeves whereby said corresponding pawls are inoperative to advance said indicator rings; certain of said indicator rings arranged with one ratchet tooth of different configuration and arranged for cooperation with the succeeding transfer sleeve to effect digital advance of a succeeding indicator ring irrespective of operation of its corresponding key plate; said drive knob having a pair of axially displaced but connected circumferential slots, said shell having a pin to ride in said slots, one of said slots being circumferentially limited to permit only sufficient movement of said knob and shaft to effect digital advance of said indicator rings, the second of said slots permitting sufficient rotation of said drive knob and shaft to effect movement of all of said indicator rings to a common position; and clearing means operable, upon axial displacement of said shaft and drive knob and subsequent rotational movement of said shaft and drive knob as determined by said second slot, to engage all of said indicator rings and cause them to be brought into identical positions.

References Cited in the file of this patent

UNITED STATES PATENTS

| Number | Name | Date |
|---|---|---|
| 545,322 | Voelker | Aug. 27, 1895 |
| 617,052 | Sawyer | Jan. 3, 1899 |
| 811,416 | Lauber | Jan. 30, 1906 |
| 1,009,886 | Von Bechtolsheim | Nov. 28, 1911 |
| 1,333,061 | Browne | Mar. 9, 1920 |
| 1,600,766 | Larson | Sept. 21, 1926 |